United States Patent [19]
Lafferty

[11] 3,920,264
[45] Nov. 18, 1975

[54] VEHICLE LOW-LOAD ISOLATOR SPRING SUSPENSION APPARATUS

[76] Inventor: James W. Lafferty, 11122 Wright Road, Lynwood, Calif. 90262

[22] Filed: Nov. 13, 1974

[21] Appl. No.: 523,347

[52] U.S. Cl. .......................... 280/124 R; 267/54 B
[51] Int. Cl.² ................................... B60G 11/36
[58] Field of Search ..... 280/124 R; 267/54 R, 54 B, 267/55, 56

[56] References Cited
UNITED STATES PATENTS

| | | | |
|---|---|---|---|
| 1,888,897 | 11/1932 | Wagner | 267/54 R |
| 2,006,439 | 7/1935 | Chamberlain | 267/54 B |

*Primary Examiner*—Philip Goodman
*Attorney, Agent, or Firm*—Charles A. Goodall

[57] ABSTRACT

A vehicle low load isolator spring suspension apparatus providing an auxiliary spring means interposed between a vehicle frame member of a vehicle spring mass portion, said spring mass portion comprising that part of the vehicle body and frame which is supported by a leaf spring, and a rear portion of a leaf spring, said leaf spring being connected to an unsprung mass portion of said vehicle, said unsprung portion comprising the wheels, wheel axle and other parts mounted thereon, said auxiliary spring means coacting with said leaf spring providing a buffer between said frame member and the leaf spring rear portion when the vehicle is lightly loaded or has no load other than the vehicle spring mass.

14 Claims, 7 Drawing Figures

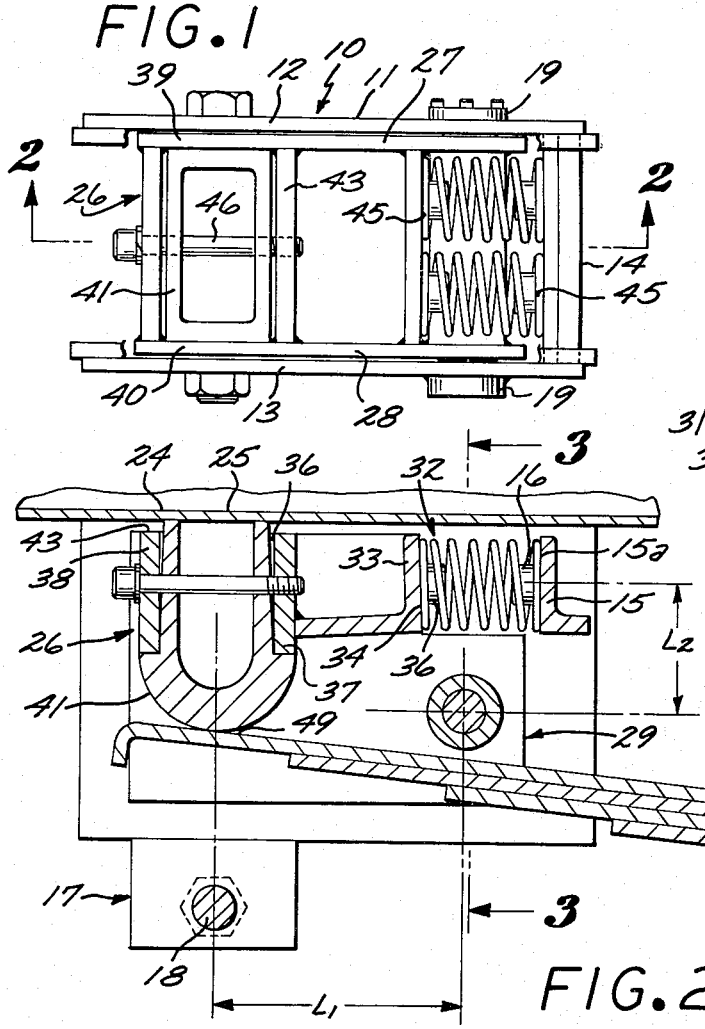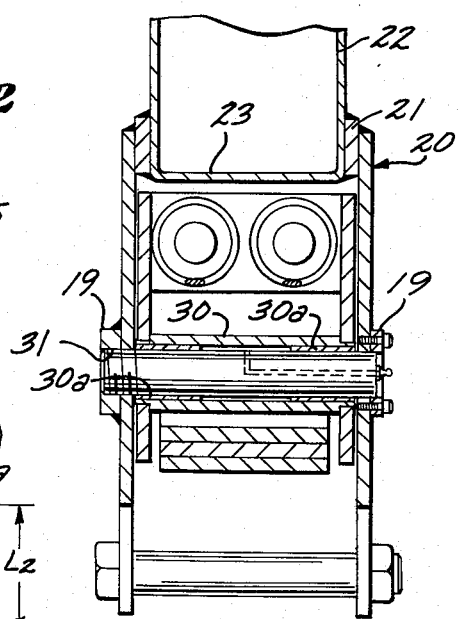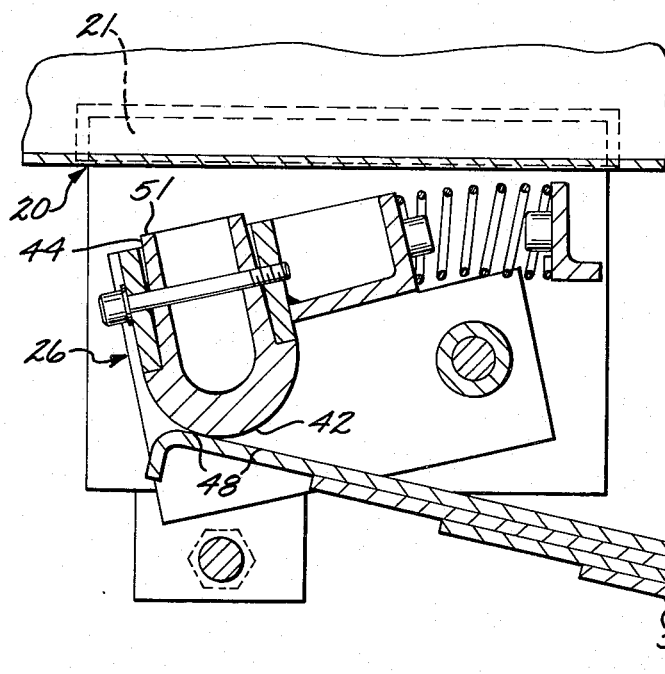

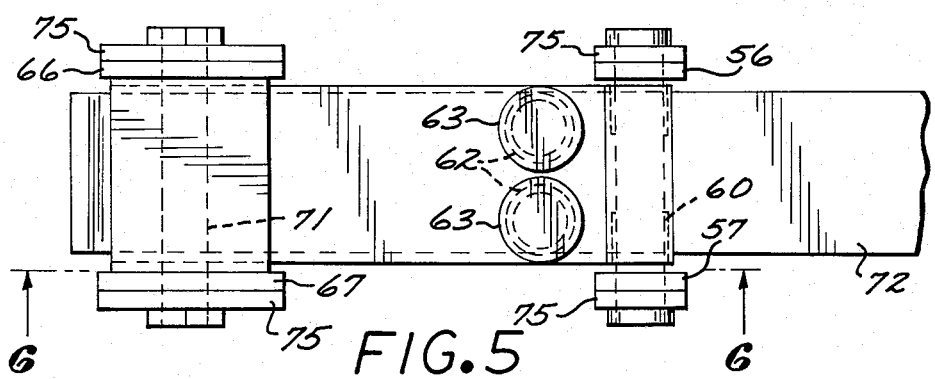
FIG. 5
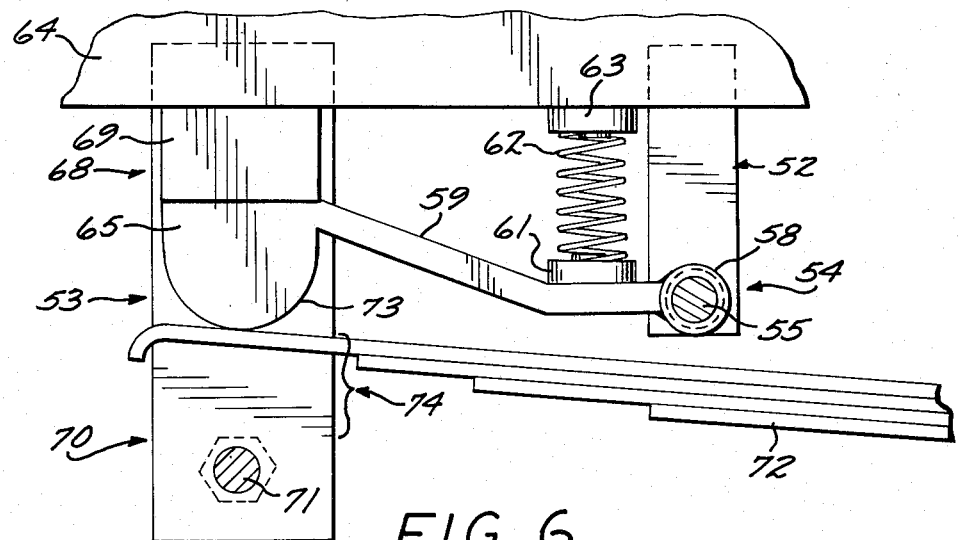
FIG. 6
FIG. 7
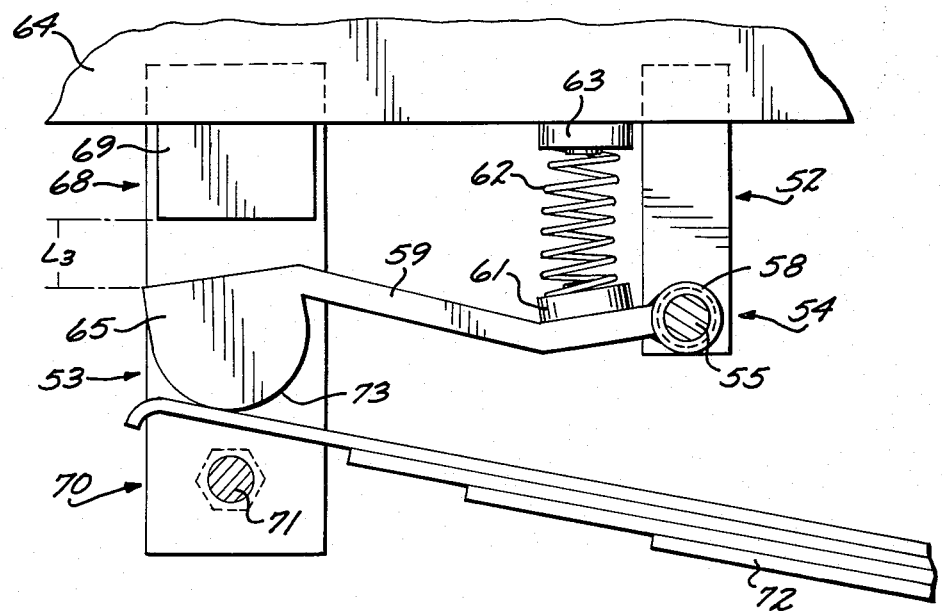

VEHICLE LOW-LOAD ISOLATOR SPRING SUSPENSION APPARATUS

BACKGROUND OF THE INVENTION

1. Field of Invention

This invention relates to a vehicle low-load isolator spring suspension apparatus providing an auxiliary spring means for isolating the spring mass portion of a vehicle, said portion being the frame and vehicle body which is supported by leaf springs, from the supporting unsprung mass, comprising the wheels, axles and other parts connected thereto, so that energy changes transferred to the unspring mass of the moving vehicle, are absorbed thereby when the vehicle has a low load or is unloaded, as minor road obstructions are encountered by the moving vehicle.

2. Discussion of Prior Art

Leaf springs of sprung vehicles are generally designed for a specific maximum load so the suspension will be satisfactory under service conditions and provide an effective energy absorber for the spring portion of the loaded vehicle from road obstructions encountered by the moving vehicle. Under partial or no-load conditions the rate of flexibility of the leaf spring is such that it does not absorb the energy resulting from impact of the wheels with minor road obstructions and the energy is accordingly transmitted to the sprung mass by the leaf spring which is effectively acting as a solid member. This results in a condition such that as the wheel elevates as it passes over a road obstruction the entire spring mass which is supported by the leaf spring is proportionally elevated. Inasmuch as the wheels are relatively widely separated, first one wheel elevates then subsequently another wheel elevates transmitting the resultant forces to the spring mass. The wheels are joined by leaf springs to a vehicle frame member which has a natural frequency of vibration and which bends or reacts to these high frequency force changes much in the same manner as a spring board. At some point in time, the natural frequency of the frame may be reached and the entire vehicle suspension system and frame goes into oscillation. This is particularly true if the road obstructions are encountered at a regular rate, thereby causing a forcing frequency which matches that of the frame to amplify the natural motion of the frame.

Various devices, such as systems comprising a plurality of springs which become operative in succession as the load is increased and decreased, systems of coil springs or pneumatic of mechanical levelizers, an auxiliary spring suspension and levelizer mechanism having link mechanism connected between the vehicle frame and axle and including a spring acting on the link medi, etc., have been proposed to overcome the above described unfavorable conditions. These have generally failed to provide adequate resolutions of the problem and in general are complicated and costly to manufacture. U.S. Pat. Nos. 2,607,610; 2,650,108; 2,687,311 and 2,990,170 are illustrative of a few such systems.

The invention herein is a new and novel approach at resolving these problems wherein the energy changes under no-load or low-load conditions are absorbed within an auxiliary spring means of the apparatus having been transmitted thereto through a rearward portion of the leaf spring or an axle mounting bar, said leaf spring rearward portion being in movable abutment with an auxiliary spring means actuatary lever arm, said lever arm being pivotally mounted within a yoke enclosing said spring means and said lever arm, said spring means providing force directed against a lever arm forward end with respect to a stationary forward yoke spring means abutment member so as to cause the said lever arm to pivot downwardly onto said leaf spring on the said rearward portion thereof, said yoke being fixedly attached to a vehicle frame member of said spring mass. The verticle and horizontal energy component changes due to minor road obstruction induced wheel motions are confined to the said vehicles low-load isolator spring suspension apparatus and particularly to the auxiliary spring means thereof and are thereby isolated from the unsprung mass of the vehicle.

SUMMARY OF THE INVENTION

A primary object of this invention is to provide a simple and novel vehicle low-load isolator spring suspension apparatus which may be interposed between a frame portion of a vehicle spring mass portion and a rearward portion of a vehicle leaf spring said leaf spring being fixedly connected at a central portion thereof to an unsprung portion of said vehicle such as a wheel axle, said leaf spring having a front end being pivotally connected to a frame member forward portion of the spring mass of said vehicle being forwardly disposed with respect to said wheel axle, said apparatus having auxiliary spring means therein for absorbing minor road obstruction induced energy changes transmitted from the vehicle unsprung mass through the leaf spring as the vehicle moves and thereby isolating said energy changes from the vehicle sprung mass.

Another object of the invention is to provide a low-load isolator spring suspension apparatus for use on heavy trucks and trailers so that relatively light equipment subject to damage upon being jarred or bumped when transported may be transported substantially free of minor road obstruction induced vibration, oscillations and bumps.

Another object of this invention is to provide a low-load isolator spring suspension apparatus which coacts with a rearward portion of a vehicle leaf spring until the isolator spring means maximum load capability is reached and then provides a relatively inactive link between said leaf spring and the frame of said sprung mass of said vehicle.

Another object of this invention is to provide a low-load isolator spring suspension apparatus which provides a fast reacting spring means to better maintain vehicle wheel contact with the road as the loaded vehicle moves along the road and wheels experience relatively road obstructions causing them to bounce upwardly off the road and as a consequence of so maintaining better wheel to road contact improve vehicle traction and braking capability.

A further object is to provide a novel vehicle low-load isolator spring suspension apparatus which is simple and inexpensive to construct and relatively simple to mount, use and maintain on vehicles, particularly large truck, tractor and trailer systems.

Another object of this invention is to provide a vehicle suspension means wherein the deferential range between a leaf spring and the apparatus herein is within the capability of the apparatus auxiliary spring means a leaf spring may be replaced by a solid unsprung mass mounting bar.

Further novel features and objects will become apparent to those of ordinary skill in the art from the following detailed description, drawings and claims.

BRIEF DESCRIPTION OF THE DRAWINGS

FIG. 1 is a top plan view of an embodiment showing an unmounted vehicle load isolator spring suspension apparatus in accordance with this invention having spring means, herein tow coil springs being mounted horizontally as opposed to vertically.

FIG. 2 is a cross-sectional view taken along line 2 — 2 of FIG. 1 showing the spring actuated lever arm in position when the vehicle on which it is mounted is loaded to exceed the auxiliary spring means force.

FIG. 3 is a cross-sectional view of FIG. 1 taken along line 3 — 3 showing a method of mounting the apparatus on a vehicle sprung mass frame member.

FIG. 4 is a cross-sectional view taken along line 2 — 2 of FIG. 1 with a further cross-sectioning of the coil spring means to show the orientation of the spring and the lever arm when the spring actuating lever arm is in a position wherein the load thereon is low.

FIG. 5 is a top plan view of an embodiment of the invention wherein the spring means is oriented in a vertical position with the spring force being exerted between the vehicle sprung mass frame member and the lever arm.

FIG. 6 is a side plan view of FIG. 5 with the outer yoke face plates removed to show details of the lever arm in a fully loaded position with respect to the apparatus maximum.

FIG. 7 is a side plan view of FIG. 5 showing the lever arm in a position where a light load is on a vehicle to which it may be mounted.

DESCRIPTION OF THE PREFERRED EMBODIMENT

Referring now to the drawings, a preferred embodiment of a vehicle low-load isolator spring suspension apparatus 10 is shown comprising the present invention. FIG. 1 shows the top plan view of an un-mounted vehicle low-load isolator spring suspension apparatus 10 whereas FIGS. 2, 3, and 4 show the apparatus mounted on a vehicle sprung mass frame member 22 shown in cross-section. Although the vehicle is not shown in these figures, the apparatus 10 when mounted for use is fixedly mounted to a vehicle sprung mass frame member 22 and is interposed between said frame member and a leaf spring 46 as shown or other unsprung mass mounting member, such as a bar. The apparatus is mounted at a leaf spring rearward portion 43, said leaf spring 46 being otherwise conventionally mounted centrally to a vehicle unsprung mass comprising wheels, wheel axle and parts connected thereto (not shown), and at a leaf spring forward end (not shown) to a forward fram portion being disposed forwardly with respect to said wheel axle, said leaf spring forward end being pivotally connect to said forward frame portion. Referring to FIGS. 1, 2, 3 and 4, the low-load isolator spring suspension apparatus 10 of the embodiment shown in the drawings comprises in combination:

A stationary yoke assembly 11 having an inner yoke face plate 12 and an outer yoke face plate 13 and fixedly connected therebetween at an upper front yoke end 14 a yoke spring means abutment member 15 having thereon on an inner surface thereof 15a yoke spring retainers 16, said inner and outer face plates having at a lower rear yoke end 17, being detachably connected between said inner and outer yoke face plates, a lever arm pivot lower stop pin 18, said inner and outer yoke face plates each have forwardly and centrally disposed thereon a pivot pin retainer housing 19, said inner and outer yoke face plates further having fixedly attached thereto on face plate top portions 20 thereof a vehicle mounting member 21 shown in the drawings weldably attached to a vehicle longitudinal frame member 22 having a vehicle frame member lower surface 23 comprising in addition thereto an upper yoke face plate 24 further comprising an upper rear yoke portion lever arm stop plate 25;

an auxiliary spring means actuating lever arm assembly 26 having an inner lever arm face plate, an outer lever arm face plate 28 and having fixedly attached therebetween at a lever arm face plate lower front portion 29, a pibot pin bearing member 30, said pivot pin bearing member having removably fixedly inserted therein at each end thereof pivot pin friction damping bushings 30a, and having a pivot pin 31 inserted therethrough, said pivot pin 31 extending through said bearing member 30 and fixedly into pivot pin retaining housing 19 in said yoke assembly 11, said pivot pin having lubricating oil passage means 31a therein, said inner and outer lever arm face plates 27, 28 further having fixedly attached on lever arm face plate upper portions 32 and being disposed backwardly from said pivot pin bearing member 30 and being fixedly attached therebetween a lever arm spring means spring means abutment member 33 having on a front face 34 thereof a lever arm spring means retainer 35, said lever arm face plates 27, 28, further having fixedly attached therebetween and being disposed backwardly from said abutment member 33 a wear block member insertion cavity 36 being defined by a front cavity wall member 37, a rear cavity wall member 38, an inner lever arm face plate rear portion 39, and an outer lever arm face plate rear portion 40, said cavity having removably inserted therein a wear block member 41 having extending downwardly from said cavity a wear block leaf spring abutment portion 42 and extending upwardly above said cavity walls upper surface 43 a wear block up-stop extension member 44, said inner and outer lever arm face plates are constructed similarly and so that the lever arm pivots freely within the yoke between the lever arm upper stop plate and the lever arm lower pivot stop pin; and an auxiliary spring means 45, herein in this embodiment comprising two compression coil springs 45 detachably inserted between said yoke spring means abutment member 15 and said lever arm spring means abutment member 33 providing a force directed such that the auxiliary spring means actuating lever arm assembly 26 lever arm force application portion $L_1$ is pivoted in a downward direction forcing the wear block member 41 into contact with a leaf spring rear portion 47 inserted within the lever arm assembly 26 having a leaf spring top rear surface 48 in movable abutment with a wear block member leaf spring abutment portion 49 of said wear block member.

When mounted as shown, the leaf spring 50 is mounted on a vehicle unsprung portion comprising the wheels, wheel axle and parts rigidly connected thereto in a conventional manner with the front portion of the leaf spring (not shown) being pivotally connected to the vehicle sprung mass portion frame member by a front leaf spring hanger in a conventional manner. The auxiliary spring means actuating lever arm then coacts with the leaf spring and auxiliary spring means 45 to provide spring suspension throughout the entire range of auxiliary spring means compresibility and the resilient limits of the vehicle leaf spring. The front spring hanger acts as a pivot point permitting the leaf spring and unsprung mass to move vertically and horizontally away from the direction of road obstruction impact. This motion is recognized by the wear block member which also acts as a friction block with respect to the leaf spring top rear surface and is part of the auxiliary spring means actuating lever assembly and is translated into both horizontal and vertical motion through the lever arm into the auxiliary spring means, herein in this embodiment two coil springs in horizontal parallel arrangement.

As shown herein, a mechanical advantage of approximately 2 to 1 is achieved in that a lever arm force application portion $L_1$ is about twice the length of a lever arm force reaction portion $L_2$ (FIG. 2). The coil springs are actuated in a manner which introduces bending in addition to compression thereof, this introduces a non-linear energy function in the spring force and thereby reduced the probability that the springs will introduce vibration into the sprung mass of the vehicle. The 2 to 1 leverage ratio (mechanical advantage) permits use of stronger coil springs that would normally be required if only the vertical components were considered. This in turn, permits use of coil springs having a lower natural frequency and therefore having better oscillation and vibration damping characteristics.

Frictional forces which are transmitted from the unsprung mass of the moving vehicle are dampened by the pivot pin friction dampening bushing 30a and in that the leaf spring rear portion is free to move horizontally as well as vertically with respect to the wear block member of the auxiliary spring means activating lever arm assembly.

The design of the apparatus must be sure that it is strong enough to accommodate all loaded forces normal to the vehicle system on which it is installed inasmuch as at some point between vehicle no load and full load conditions and particularly at full load the lever arm will "bottom out" such that the distance between a wear block up-stop extension upper surface 51 is in substantially permanent abutment with the upper rear yoke portion lever arm stop plate 25 and the leaf spring becomes the shock absorbing means thereafter. (see FIG. 2)

When used in conjunction with a leaf spring as shown herein, the apparatus will absorb the lower ranges of impact to which the leaf spring is insensitive. If the differential in load range is within the capability of the auxiliary spring means of the apparatus, the leaf spring is not necessarily required and may be replaced by a vehicle unsprung portion rigid support member. This condition is generally met in the case of a cab-over two axle vehicle (truck tractor). The differential in loading on the front axle of such a vehicle is generally less that 2,000 pounds between no-load and full load. Under these conditions the apparatus of this invention could be designed as an effective shock isolating apparatus irrespective of the leaf spring.

Another embodiment of the invention is shown in FIGS. 5, 6, and 7. This embodiment is similar in construction to the preferred embodiment except the yoke has a front first yoke member 52 and a rear second yoke member 53, said first yoke member having therein in a lower portion 54 thereof a pivot pin 55 fixedly mounted therein between an inner first yoke member face plate 56 and an outer first yoke member face plate 57, said pivot pin having pivotally mounted thereon with pivot bearing means 58 an auxiliary spring means actuating arm 59, said pivot bearing means having friction dampening bushing bearing means 60 mounted internally between said pivot pin and an inner survace of said bearing means and being located on outer ends 60 thereof and extending outwardly therefrom and in in abutment with said first yoke member face plates inner surfaces. The said lever arm has lever arm spring retainer means 61 fixedly attached thereto being located backwardly thereon with respect to said pivot bearing means thereof, said lever arm spring retainer means 61 having an auxiliary spring means 62 removably inserted therein and being interposed between said lever arm and spring retainer means and an upper spring means retainer means 63, said upper retainer may be made integral with an extension of said first yoke member or it may be mounted fixedly onto a vehicle sprung mass frame member 64, as shown. The lever arm extends backwardly and slightly upwardly from said lever arm spring retainer means and has on a rearward portion thereof a wear block 65 being integral therewith. Said wear block is inserted movably upwardly and downwardly within a second yoke means 53 having a second yoke means inner face plate 66 and a second yoke means outer face plate 67 and having on an upper portion 68 therebetween a lever arm wear block up-stop 69 and on a lower portion 70 therebetween a lever arm lower stop pin 71, said second yoke means having between a wear block vehicle unsprung mass suspension member (a leaf spring 72 is shown) abutment portion 73 and said lower stop pin 69 a vehicle unsprung mass suspension member insertion opening 74. Each of the said first and second yoke members have on an upper portion thereof vehicle frame member mounting means 75. FIG. 5 shows the apparatus in use on a vehicle loaded above the load capability of the low load isolator spring suspension apparatus and FIG. 7 shows the apparatus installed on a relatively lightly loaded vehicle with the wear block forced downwardly and away from the up-stop distance $L_3$ being proportional to the weight of the vehicle required to bring the apparatus to its maximum load capabilities.

I claim as my invention:

1. A vehicle low load isolator spring suspension apparatus comprising a yoke assembly having pivotally mounted therein an auxiliary spring means actuating lever arm, said lever arm having a lever arm reaction portion being disposed upwardly thereon with respect to a lever arm pivot means and comprising an upward extension of said lever arm having thereon on a front face thereof a spring means abutment member, said lever arm further having backwardly disposed from said lever arm reaction portion a lever arm force application portion being backwardly disposed from said pivot means, said yoke assembly having forwardly disposed from said lever arm spring means abutment member and being axially aligned therewith, a stationary yoke spring means abutment member being fixedly attached to said yoke assembly, said spring means abutment members having interposed therebetween an auxiliary spring means providing a force directed backwardly from said stationary yoke spring means abutment member and against said lever arm spring means abutment member thereby forcing said lever arm force application member to pivot downwardly within said yoke assembly, said lever arm force application portion having on a rearward end thereof a wear block member being upwardly and downwardly movable within a rear portion yoke assembly vehicle unsprung mass suspension member insertion member, said insertion member having on a top portion thereof an upper lever arm stop member and on a lower portion thereof a lower lever arm stop member and intermediate therebetween and being disposed downwardly with respect to said wear block member a vehicle unsprung mass suspension member insertion portion, said wear block having a lower surface thereof comprising a vehicle unsprung mass suspension member abutment means for abutting against said suspension member upper rearward surface when said apparatus is installed on a vehicle, said suspension member being free to move in a direction parallel to a longintudinal axis of the vehicle and upwardly and downwardly with respect to said vehicle frame member within said yoke assembly rear portion limited by said wear block abutment surface and said lower lever arm stop member, said suspension member supplying an upward force against said wear block abutment member and thereby to said lever arm force application portion, the yoke assembly having on a top portion thereof a vehicle sprung mass portion frame member mounting means for mounting said apparatus to a frame member of said vehicle sprung mass portion, said portion comprising the vehicle body and parts connected to an upper portion of a suspension means, said apparatus to be mounted above a rearward portion of a rear portion of a vehicle suspension member.

2. A vehicle low load isolator spring suspension apparatus as set forth in claim 1 wherein said lever arm reaction portion is backwardly disposed from said pivot means.

3. A vehicle low load isolator spring suspension apparatus as set forth in claim 1 wherein a lever arm force application portion length and a lever arm reaction portion length are such as to substantially provide a two to one lever mechanical advantage therebetween.

4. A vehicle low load isolator spring suspension apparatus as set forth in claim 1 wherein said rear portion yoke assembly vehicle unsprung mass suspension member insertion member is non-integral with said yoke assembly forming a two piece yoke assembly comprising a front yoke section being similarly constructed to the forward portion of said yoke assembly as set forth in claim 1 and a back yoke section comprising the said insertion member thereof.

5. A vehicle low load isolator spring suspension apparatus as set forth in claim 1 wherein said vehicle unsprung mass suspension member is a leaf spring wherein said leaf spring is mounted in an otherwise conventional manner on a vehicle having a front portion thereof being forward of a wheel axle being pivotally connected to a sprung mass frame member at a position forward with respect to said wheel axle.

6. A vehicle low load isolator spring suspension apparatus as set forth in claim 1 wherein said vehicle unsprung mass suspension member is a solid bar comprising a rear portion of a vehicle unsprung mass mounting member being backwardly and upwardly disposed from said wheel axle, said mounting member having a front portion thereof being pivotally connected to a vehicle sprung mass frame member by a pivot means, and pivot means being forwardly disposed and upward therefrom with respect to said wheel axle.

7. A vehicle low load isolator spring suspension apparatus as set forth in claim 1 wherein said wear block is detachably connected to said lever arm rearward portion to permit replacement thereof.

8. A vehicle low load isolator spring suspension apparatus comprising a yoke assembly having an inner yoke face plate and an outer yoke face plate and having fixedly connected therebetween a yoke spring means abutment member having thereon on an inner surface thereof a yoke spring means retainer, said inner and outer yoke face plates having at a lower rear yoke end being connected between said inner and outer yoke face plates, a lever arm pivot lower stop member, said inner and outer yoke face plates each having forwardly and centrally disposed thereon a pivot pin retainer means, said yoke face plates further having fixed attached thereto on a face plate top portion being oppositely disposed with respect to said lever arm pivot lower stop member an upper rear yoke portion lever arm stop member, said yoke assembly having on an upper portion thereof being on the outer faces thereof mounting means for attaching said yoke to a vehicle sprung mass frame member, said yoke assembly having pivotally mounted therein an auxiliary spring means actuating lever arm assembly further comprising an inner lever arm face plate, an outer lever arm face plate and having fixedly attached therebetween at a lever arm face plate front portion a pivot pin bearing member having a pivot pin inserted therethrough, said pivot pin extending through said bearing member and fixedly into said pivot pin retainer means of said yoke assembly, said inner and outer lever arm face plates further having fixedly connected therebetween on upper portions thereof and being backwardly disposed from said pivot pin bearing member a lever arm spring means abutment member having on a front face thereof a lever arm spring means retaining member, said lever arm face plates further having fixedly attached therebetween and being disposed backwardly from said spring means abutment member a wear block cavity front member and being backwardly disposed therefrom a wear block cavity rear member forming a wear block cavity in cooperation with inner and outer lever arm face plates, said cavity having replaceably inserted therein a wear block having a top portion thereof disposed upwardly from a top portion of said cavity front and rear members extending slightly above top surfaces thereof, said top surfaces of said front and rear cavity members being parallel with top surfaces of said inner and outer lever arm face plates, said wear block having a top surface lever arm upper stop member abutment surface and having a lower surface comprising a vehicle unsprung mass suspension member rear upper surface abutment member said lower survace extending below said wear block cavity of said lever arm, said wear block member being fixedly and detachably mounted within said wear block cavity, said lever arm spring means abutment member and said yoke spring means abutment member having detachably mounted therebetween an auxiliary spring means providing a force directed against said lever arm such that said auxiliary spring means actuating lever arm assembly is pivoted downwardly within said yoke assembly, said yoke rear portion having intermediate between said upper lever arm stop member and lever arm pivot lower stop member a vehicle unspring mass leaf spring rearward portion insertion cavity being below said wear block member, said wear block member coacting with a vehicle unsprung mass leaf spring when said leaf spring is inserted within said leaf spring insertion cavity, said leaf spring being otherwise connected to the vehicle unsprung mass in a conventional manner with a front portion of said leaf spring being forwardly disposed from a wheel axle and being pivotally connected to a vehicle sprung mass frame member.

9. A vehicle low load isolator spring suspension apparatus comprising a first yoke means having a vehicle sprung mass frame member mounting means on a first yoke means upper portion and having pivot means on a lower portion thereof and having pivotally connected to said pivot means an auxiliary spring means actuating lever arm having backwardly disposed thereon from said pivot means an auxiliary spring means lever arm spring abutment member having located thereon a spring means retainer member, said lever arm having backwardly disposed from said spring means abutment member on a lever arm rearward portion on a lower surface thereof a vehicle unsprung mass suspension member abutment member, said lever arm rearward portion and vehicle unsprung mass suspension member abutment member being movably upwardly and downwardly enclosed in a second yoke means, said second yoke means having therein in an upper portion thereof an upper lever arm stop member, said second yoke means having on an upper exterior portion thereof a vehicle sprung mass frame member mounting means, said second yoke means further having on a lower portion thereof a lower lever arm stop member, said second yoke means having a vehicle unsprung mass suspension member insertion opening therein being intermediate said unsprung mass suspension member abutment member and said lower lever arm stop member, said lever arm spring abutment member having removably inserted in spring means retainer an auxiliary spring means, said spring means having a lower end thereof inserted in said spring means retainer means, said auxiliary spring means having at an upper end thereof and being removably attached thereto an upper spring means retainer member being integral with an auxiliary spring means upper abutment member, said upper spring abutment member having a vehicle sprung mass frame member mounting means therewith for fixedly mounting said upper spring abutment member to a vehicle frame member, when mounted on a vehicle said rearward portion of said unsprung mass suspension member is inserted within said insertion opening in said second yoke means having a rear upper surface thereof in abutment with said lever arm suspension member abutment member, said suspension member thereby coacting with said lever arm and said auxiliary spring means, said suspension member being conventionally connected to said unsprung mass at a wheel axle and having a forward portion thereof being forwardly disposed with respect to said wheel axle being pivotally connected to vehicle sprung mass frame member.

10. A vehicle low load isolator spring suspension apparatus as set forth in claim 9 wherein the said lever arm rearward portion vehicle unsprung mass suspension member abutment member comprises a removable wear block.

11. A vehicle low load isolator spring suspension apparatus as set forth in claim 1 wherein said auxiliary spring means comprises a coil spring means of the compression type.

12. A vehicle low load isolator spring suspension apparatus as set forth in claim 9 wherein said auxiliary spring means comprises a coil spring means of the compression type.

13. A vehicle low load isolator spring suspension apparatus as set forth in claim 9 wherein the relationship between the rearward portion of the lever arm and the spring means abutment member with respect to the said pivot member provides a mechanical advantage of substantially two to one with respect to said suspension member abutment end of said lever arm.

14. A vehicle low load isolator spring suspension apparatus as set forth in claim 9 wherein said first yoke means and said second yoke means are integral in arrangement said second yoke means forming a rearward portion of said integral yoke means.

* * * * *